J. BIRD.
BOTTLE SIPHON.
APPLICATION FILED DEC. 23, 1916.
1,289,620. Patented Dec. 31, 1918.
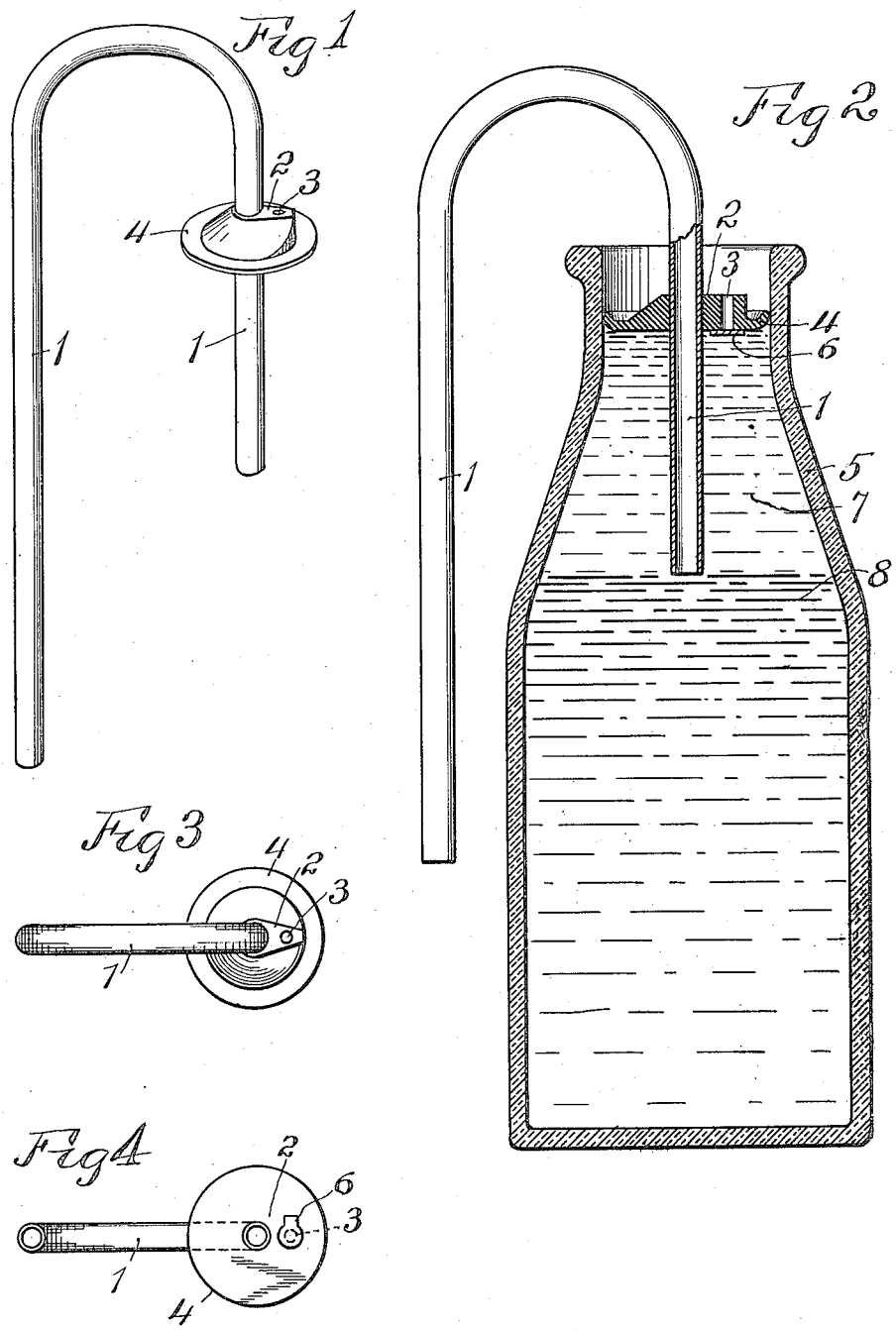
WITNESS:
R. E. Hamilton
INVENTOR.
BY John Bird
Warren D. House
His ATTORNEY

UNITED STATES PATENT OFFICE.

JOHN BIRD, OF KANSAS CITY, MISSOURI.

BOTTLE-SIPHON.

1,289,620.    Specification of Letters Patent.    Patented Dec. 31, 1918.

Application filed December 23, 1916.   Serial No. 138,548.

*To all whom it may concern:*

Be it known that I, JOHN BIRD, a citizen of the United States, residing at Kansas City, in the county of Jackson and State of Missouri, have invented a certain new and useful Improvement in Bottle-Siphons, of which the following is a specification.

My invention relates to improvements in bottle siphons.

The object of my invention is to provide a novel bottle siphon, which is simple in construction, cheap to manufacture, and whch may be quickly and easily applied to a bottle containing liquid and caused to discharge the contents, or a desired portion thereof, from the bottle.

My invention is particularly well adapted for use in removing cream from a milk bottle without disturbing or removing the milk.

The novel features of my invention are hereinafter fully described and claimed.

In the accompanying drawing which illustrates the preferred embodiment of my invention.

Figure 1 is a perspective view of my improved bottle siphon.

Fig. 2 is a view partly in vertical section and partly in elevation, of my improved bottle siphon shown mounted in an ordinary milk bottle containing milk and cream.

Fig. 3 is a top view of the siphon.

Fig. 4 is a bottom view of the same.

Similar reference characters designate similar parts in the different views.

1 designates an ordinary siphon tube having a long and a short leg.

Mounted on the short leg of the siphon tube 1, preferably tightly longitudinally slidable thereon is a piston member provided with a relatively thick central portion 2 through which the short leg of the siphon extends and provided with a vertical hole 3 therethrough. The piston member is provided with a relatively thin flexible annular peripheral portion 4 which is adapted to be slidably fitted in the neck of a bottle 5, as shown in Fig. 2.

If desired, the piston member may be provided with an inwardly closing valve which normally closes the hole 3. The valve may, however, be dispensed with. If employed, it may comprise a flexible flap valve 6, preferably comprising a thin soft rubber piece having one end attached to the under side of the piston member and having a free end which extends across the lower end of the hole 3.

In the operation of my invention, the piston member 2 is forced downwardly into the neck of the bottle 5, thereby forcing the short leg of the siphon tube 1 into the cream 7 which is in the bottle 5 above the milk 8. The piston member forces the cream 7 upwardly through the short leg and into the long leg of the siphon tube 1. The piston member is forced downwardly a distance sufficient to fill the tube 1 to a point below the horizontal level of the lower end of the short leg of the tube. Provision is thus made for effecting a continuous siphon flow upon the mere insertion of the piston member to the proper position in the neck of the bottle. This will continue until the level of the liquid reaches the lower end of the short leg of the tube, upon which the air which has entered the bottle through the hole 3 during the siphon flow, will enter the siphon tube and break the siphon flow. If the short leg of the siphon tube has been inserted in the bottle to the level of the milk, all of the cream will be discharged from the bottle, after which the milk may be poured out in the usual manner, or left in the bottle as may be desired.

If the valve 6 is employed in the construction, it will automatically close the hole 3 when the piston member is being forced downwardly in starting the siphon flow. As soon as the siphon flow has started, the atmospheric pressure will force the valve 6 to the open position, thereby permitting air to pass into the bottle to take the place of the cream which is being discharged.

In case that the valve 6 is eliminated in the construction, the operator places a finger or a thumb over the top of the hole 3 when the piston member is being forced downwardly in starting the siphon flow. The hole 3 is thus closed during the downward movement of the piston member. After said member has been forced to the desired position, the operator withdraws his hand and permits the air to pass into the bottle through the hole 3.

By having the hole 3 extending through the relatively thick portion 2 of the piston member, the upper end of the hole is within convenient reach of the operator's thumb or finger, and by having the central portion relatively thick, this portion will not bend or yield under the pressure of the operator's hand, thus enabling the piston member to be readily forced to the operative position. Furthermore, the thick central portion of the piston member provides a firm and air-tight bearing for the siphon tube 1.

By having the peripheral portion of the piston member relatively thin and flexible, said member is readily adapted to fit snugly into bottles which have necks of different interior diameters. It also permits the piston member to be tilted from the horizontal, and to retain such tilted position, when it is desired to incline the long leg of the tube from the vertical, to accommodate the tube to differently shaped receiving vessels, not shown.

The siphon tube 1 may be of any suitable material, such as aluminum, block tin or any other material suitable for the purpose desired.

The piston member 2 may be made of any suitable material, the best for the purpose being soft rubber.

I do not limit my invention to the structure shown and described, as modifications, within the scope of the appended claim, may be made without departing from the spirit of my invention.

What I claim is:

A bottle siphon comprising a siphon tube, and a piston member having a relatively thick resilient portion through which the short leg of the siphon tube extends and is tightly slidably fitted and having a transverse air hole therethrough, said member having a relatively thin peripheral portion adapted to be slidably fitted in and supported by the neck of a bottle, said peripheral portion being flexible so as to permit the piston member to be tilted to different positions and to fit necks of different interior diameters.

In testimony whereof I have signed my name to this specification.

JOHN BIRD.